Nov. 14, 1939.  A. R. THOMPSON  2,179,967
GEAR WHEEL
Filed April 22, 1938
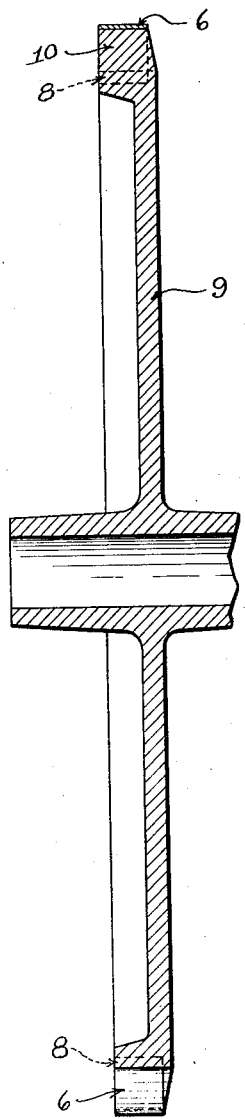
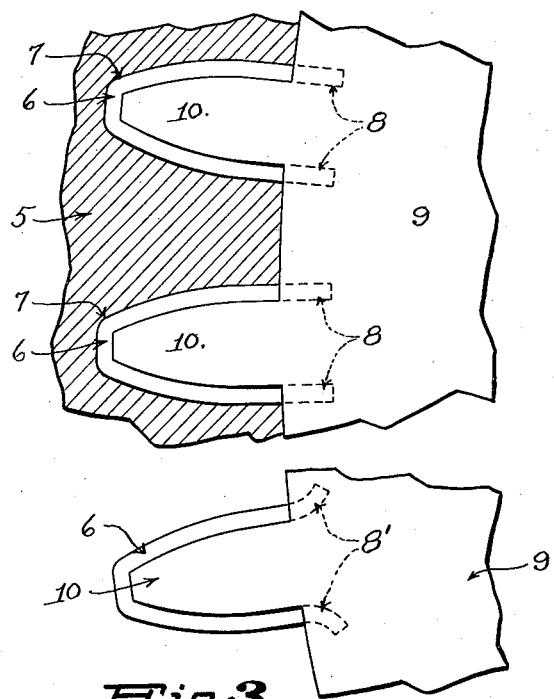
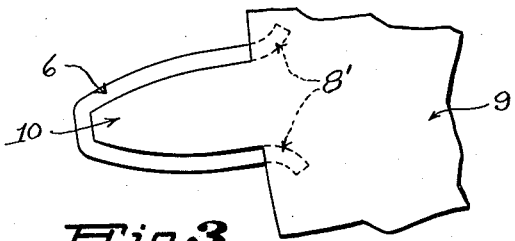
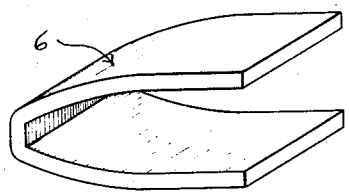
INVENTOR,
Albert R. Thompson
BY Booth & Booth
ATTORNEYS.

Patented Nov. 14, 1939

2,179,967

UNITED STATES PATENT OFFICE 2,179,967

GEAR WHEEL

Albert R. Thompson, Los Gatos, Calif., assignor to Food Machinery Corporation, San Jose, Calif., a corporation of Delaware Application April 22, 1938, Serial No. 203,532

1 Claim. (Cl. 74—460)

The present invention relates to gear wheels with reinforced teeth, and has for its principal object the production of a gear whose teeth or portions thereof can be formed of a different material from the body of the gear.

A gear made in conformity with the present invention may have a body of some cheap and easily worked material such as cast iron, and teeth formed wholly or in part of a harder material more resistant to wear and corrosion, such as stainless steel. The proportions of the body and tooth reinforcing materials, and the process of manufacture, are such that a gear having superior wearing qualities can be made cheaply.

The particular embodiment of the invention herein described and illustrated, by way of example only, is designed as a conveyer disk for use in exhaust boxes of the type shown in my United States Patent No. 1,521,407, issued December 30, 1924. It is to be understood, however, that the invention is not limited or restricted to such use, nor to the materials described herein by way of example, but may be embodied in gears made of any other suitable materials and designed for any use. It is also to be understood that changes may be made, within the scope of the claim hereto appended, in the form and construction of the several parts, and in the several steps of the process of manufacture, as herein shown and described.

Reference will be made to the accompanying drawing, in which

Fig. 1 is a transverse section of a gear wheel embodying a preferred form of the invention.

Fig. 2 is a broken side view, on a larger scale, of a portion of the gear as it appears before being removed from the mold in which it is cast, the mold being shown in section.

Fig. 3 is a broken side view of a portion of a gear showing a modified form of reinforcing member.

Fig. 4 is a perspective view of one of the tooth reinforcing members.

In the drawing, the reference numeral 5, shown in Fig. 2, designates a mold in which the gear is cast. The mold may be formed in any usual manner of any suitable material. After the mold is formed, a tooth reinforcing member 6 is inserted in each tooth recess 7 of said mold. In the particular structure herein shown, the reinforcing member consists of a flat strip whose width coincides with the width of the tooth face of the gear, and which is bent to the form of an individual tooth, as shown in Fig. 4. The ends of said reinforcing member extend inwardly a short distance beyond the base of the tooth, as shown at 8 in Figs. 1 and 2, and said ends may be either straight, as in Fig. 2, or bent laterally, as shown at 8' in Fig. 3.

After the reinforcing members 6 have been placed in the tooth recesses 7 of the mold 5, the body 9 of the gear is cast, by being poured into the mold in the usual manner. The body material flows into the reinforcing members 6 to form tooth bodies or cores 10 therewithin, and embeds the ends 8 or 8', which serve as anchors to assist the natural bond between the two materials in holding the reinforcing members in place.

When the gear is removed from the mold, it has each tooth covered with a layer of reinforcing material which is firmly bonded and locked in place, and which covers the entire wearing surface of the tooth. The gear may be finished, if desired, by any suitable machining or grinding process.

If the body is made of cast iron and the reinforcing members of some hard alloy such as stainless steel, a gear is provided whose hub and sides can be easily turned in a lathe, and whose teeth have hard surfaces resistant to wear and corrosion. Such a gear is especially advantageous in an exhaust box of the type previously referred to, in which corrosion due to slightly acidulated steam causes rapid wear of ordinary iron teeth.

I claim:

A gear wheel comprising a body of cast metal having integral gear teeth thereon, each of said gear teeth being provided with an individually formed facing strip of wear resistant sheet metal closely fitting the contour of the tooth, said facing strips having their inner ends cast directly into said gear body whereby they are firmly secured in place.

ALBERT R. THOMPSON.